(12) United States Patent
Briggs et al.

(10) Patent No.: US 8,782,690 B2
(45) Date of Patent: Jul. 15, 2014

(54) INTERACTIVE PRODUCT PLACEMENT SYSTEM AND METHOD THEREFOR

(71) Applicant: Cinsay, Inc., Dallas, TX (US)

(72) Inventors: Christian Briggs, Newport Coast, CA (US); Heath McBurnett, Aliso Viejo, CA (US); Delfino Galindo, Jr., Laguna Niguel, CA (US); Freddy Knuth, Euless, TX (US)

(73) Assignee: Cinsay, Inc., Dallas, TX (US)

( * ) Notice: Subject to any disclaimer, the term of this patent is extended or adjusted under 35 U.S.C. 154(b) by 0 days.

(21) Appl. No.: 14/042,477

(22) Filed: Sep. 30, 2013

(65) Prior Publication Data

US 2014/0068660 A1     Mar. 6, 2014

Related U.S. Application Data

(63) Continuation of application No. 13/762,184, filed on Feb. 7, 2013, now Pat. No. 8,549,555, and a continuation of application No. 13/605,892, filed on Sep. 6, 2012, now Pat. No. 8,533,753, and a continuation of application No. 12/363,713, filed on Jan. 30, 2009, now Pat. No. 8,312,486.

(60) Provisional application No. 61/024,829, filed on Jan. 30, 2008.

(51) Int. Cl.
| | |
|---|---|
| *H04N 7/025* | (2006.01) |
| *H04N 21/435* | (2011.01) |
| *H04N 21/478* | (2011.01) |
| *H04N 21/4725* | (2011.01) |
| *H04N 21/4722* | (2011.01) |
| *H04N 21/81* | (2011.01) |

(52) U.S. Cl.
CPC ......... *H04N 21/4722* (2013.01); *H04N 21/435* (2013.01); *H04N 21/47815* (2013.01); *H04N 21/4725* (2013.01); *H04N 21/812* (2013.01)
USPC .......................................................... 725/32

(58) Field of Classification Search
USPC ...................................................... 725/32–36
See application file for complete search history.

(56) References Cited

U.S. PATENT DOCUMENTS

| | | | |
|---|---|---|---|
| 5,774,664 | A | 6/1998 | Hidary et al. |
| 5,778,181 | A | 7/1998 | Hidary et al. |

(Continued)

FOREIGN PATENT DOCUMENTS

| | | |
|---|---|---|
| WO | WO 01/69364 A2 | 9/2001 |
| WO | WO 2008/016634 A2 | 2/2008 |
| WO | WO 2009/012580 A1 | 1/2009 |

OTHER PUBLICATIONS

Notification of Transmittal of the International Search Report and the Written Opinion of the International Searching Authority, or the Declaration dated Jun. 24, 2011 in connection with International Patent Application No. PCT/US10/57567.

(Continued)

*Primary Examiner* — Nicholas Corbo

(57) ABSTRACT

A method for presenting advertisements for commercial products in video productions, whereby the commercial product is placed in the video production as an element of the video production. A viewer is enabled to interact with the video production to select the product. Information is then displayed about the selected product; and the viewer is enabled to purchase the selected product.

30 Claims, 5 Drawing Sheets

(56) References Cited

U.S. PATENT DOCUMENTS

| | | | |
|---|---|---|---|
| 5,903,816 A | 5/1999 | Broadwin et al. |
| 5,929,849 A | 7/1999 | Kikinis |
| 6,006,257 A | 12/1999 | Slezak |
| 6,009,410 A | 12/1999 | LeMole et al. |
| 6,014,638 A | 1/2000 | Burge et al. |
| 6,018,768 A | 1/2000 | Ullman et al. |
| 6,154,771 A | 11/2000 | Rangan et al. |
| 6,169,573 B1 | 1/2001 | Sampath-Kumar et al. |
| 6,188,398 B1 | 2/2001 | Collins-Rector et al. |
| 6,233,682 B1 | 5/2001 | Fritsch |
| 6,240,555 B1 | 5/2001 | Shoff et al. |
| 6,263,505 B1 | 7/2001 | Walker et al. |
| 6,275,989 B1 | 8/2001 | Broadwin et al. |
| 6,282,713 B1 | 8/2001 | Kitsukawa et al. |
| 6,321,209 B1 | 11/2001 | Pasquali |
| 6,330,595 B1 | 12/2001 | Ullman et al. |
| 6,357,042 B2 | 3/2002 | Srinivasan et al. |
| 6,536,041 B1 | 3/2003 | Knudson et al. |
| 6,564,380 B1 | 5/2003 | Murphy |
| 6,628,307 B1 | 9/2003 | Fair |
| 6,766,528 B1 | 7/2004 | Kim et al. |
| 6,857,010 B1 | 2/2005 | Cuijpers et al. |
| 6,910,049 B2 | 6/2005 | Fenton et al. |
| 6,912,726 B1 | 6/2005 | Chen et al. |
| 6,976,028 B2 | 12/2005 | Fenton et al. |
| 6,990,498 B2 | 1/2006 | Fenton et al. |
| 7,000,242 B1 | 2/2006 | Haber |
| 7,017,173 B1 | 3/2006 | Armstrong et al. |
| 7,072,683 B2 | 7/2006 | King et al. |
| 7,136,853 B1 | 11/2006 | Kohda et al. |
| 7,158,676 B1 | 1/2007 | Rainsford |
| 7,162,263 B2 | 1/2007 | King et al. |
| 7,188,186 B1 | 3/2007 | Meyer et al. |
| 7,207,057 B1 | 4/2007 | Rowe |
| 7,222,163 B1 | 5/2007 | Girouard et al. |
| 7,231,651 B2 | 6/2007 | Pong |
| 7,243,139 B2 | 7/2007 | Ullman et al. |
| 7,254,622 B2 | 8/2007 | Nomura et al. |
| 7,269,837 B1 | 9/2007 | Redling et al. |
| 7,331,057 B2 | 2/2008 | Eldering et al. |
| 7,353,186 B2 | 4/2008 | Kobayashi |
| 7,409,437 B2 | 8/2008 | Ullman et al. |
| 7,412,406 B2 | 8/2008 | Rosenberg |
| 7,444,659 B2 | 10/2008 | Lemmons |
| 7,464,344 B1 | 12/2008 | Carmichael et al. |
| 7,487,112 B2 | 2/2009 | Barnes, Jr. |
| 7,509,340 B2 | 3/2009 | Fenton et al. |
| 7,539,738 B2 | 5/2009 | Stuckman et al. |
| 7,574,381 B1 | 8/2009 | Lin-Hendel |
| 7,593,965 B2 | 9/2009 | Gabriel |
| 7,613,691 B2 | 11/2009 | Finch |
| 7,614,013 B2 | 11/2009 | Dollar et al. |
| 7,624,416 B1 | 11/2009 | Vandermolen et al. |
| 7,631,327 B2 | 12/2009 | Dempski et al. |
| 7,661,121 B2 | 2/2010 | Smith et al. |
| 7,664,678 B1 | 2/2010 | Haber |
| 7,673,017 B2 | 3/2010 | Kim et al. |
| 7,721,307 B2 | 5/2010 | Hendricks et al. |
| 7,739,596 B2 | 6/2010 | Clarke-Martin et al. |
| 7,756,758 B2 | 7/2010 | Johnson et al. |
| 7,769,827 B2 | 8/2010 | Girouard et al. |
| 7,769,830 B2 | 8/2010 | Stuckman et al. |
| 7,774,161 B2 | 8/2010 | Tischer |
| 7,774,815 B1 | 8/2010 | Allen |
| 7,818,763 B2 | 10/2010 | Sie et al. |
| 7,870,592 B2 | 1/2011 | Hudson et al. |
| 7,885,951 B1 | 2/2011 | Rothschild |
| 7,899,719 B2 | 3/2011 | Lin-Hendel |
| 7,912,753 B2 | 3/2011 | Struble |
| 7,925,973 B2 | 4/2011 | Allaire et al. |
| 7,975,062 B2 | 7/2011 | Krikorian et al. |
| 7,979,877 B2 | 7/2011 | Huber et al. |
| 7,987,483 B1 | 7/2011 | Des Jardins |
| 8,001,116 B2 | 8/2011 | Cope |
| 8,001,577 B2 | 8/2011 | Fries |
| 8,006,265 B2 | 8/2011 | Redling et al. |
| 8,010,408 B2 | 8/2011 | Rubinstein et al. |
| 8,032,421 B1 | 10/2011 | Ho et al. |
| 8,055,688 B2 | 11/2011 | Giblin |
| 8,091,103 B2 | 1/2012 | Cope |
| 8,108,257 B2 | 1/2012 | Sengamedu |
| 8,122,480 B2 | 2/2012 | Sholtis |
| 8,141,112 B2 | 3/2012 | Cope et al. |
| 8,181,212 B2 | 5/2012 | Sigal |
| 8,196,162 B2 | 6/2012 | van de Klashorst |
| 8,433,611 B2 | 4/2013 | Lax et al. |
| 8,468,562 B2 | 6/2013 | Miller et al. |
| 2002/0062481 A1 | 5/2002 | Slaney et al. |
| 2002/0075332 A1 | 6/2002 | Geilfuss, Jr. et al. |
| 2002/0083469 A1 | 6/2002 | Jeannin et al. |
| 2002/0126990 A1 | 9/2002 | Rasmussen et al. |
| 2003/0028873 A1 | 2/2003 | Lemmons |
| 2003/0149983 A1 | 8/2003 | Markel |
| 2003/0163832 A1 | 8/2003 | Tsuria et al. |
| 2004/0021684 A1 | 2/2004 | Millner |
| 2005/0022226 A1 | 1/2005 | Ackley et al. |
| 2005/0033656 A1 | 2/2005 | Wang et al. |
| 2005/0076372 A1 | 4/2005 | Moore et al. |
| 2006/0009243 A1 | 1/2006 | Dahan et al. |
| 2006/0136305 A1 | 6/2006 | Fitzsimmons et al. |
| 2006/0242016 A1 | 10/2006 | Chenard |
| 2006/0265657 A1 | 11/2006 | Gilley |
| 2007/0106646 A1 | 5/2007 | Stern et al. |
| 2007/0150360 A1 | 6/2007 | Getz |
| 2007/0157228 A1 | 7/2007 | Bayer et al. |
| 2007/0180461 A1 | 8/2007 | Hilton |
| 2007/0239546 A1 | 10/2007 | Blum et al. |
| 2007/0266399 A1 | 11/2007 | Sidi |
| 2007/0288518 A1 | 12/2007 | Crigler et al. |
| 2007/0300263 A1* | 12/2007 | Barton et al. ............ 725/60 |
| 2007/0300280 A1 | 12/2007 | Turner et al. |
| 2008/0005999 A1 | 1/2008 | Pervan |
| 2008/0066099 A1 | 3/2008 | Brodersen et al. |
| 2008/0066107 A1 | 3/2008 | Moonka et al. |
| 2008/0098425 A1 | 4/2008 | Welch |
| 2008/0109306 A1 | 5/2008 | Maigret et al. |
| 2008/0109844 A1 | 5/2008 | Baldeschwieler et al. |
| 2008/0126949 A1 | 5/2008 | Sharma |
| 2008/0177627 A1 | 7/2008 | Cefail |
| 2008/0177630 A1 | 7/2008 | Maghfourian et al. |
| 2008/0235085 A1 | 9/2008 | Kovinsky et al. |
| 2008/0250445 A1 | 10/2008 | Zigmond et al. |
| 2008/0255934 A1 | 10/2008 | Leventhal et al. |
| 2008/0276266 A1 | 11/2008 | Huchital et al. |
| 2008/0281685 A1 | 11/2008 | Jaffe et al. |
| 2008/0294694 A1 | 11/2008 | Maghfourian et al. |
| 2008/0306999 A1 | 12/2008 | Finger et al. |
| 2008/0307310 A1 | 12/2008 | Segal et al. |
| 2008/0319852 A1* | 12/2008 | Gardner et al. ............ 705/14 |
| 2008/0319856 A1 | 12/2008 | Zito et al. |
| 2009/0013347 A1 | 1/2009 | Ahanger et al. |
| 2009/0018904 A1 | 1/2009 | Shipman et al. |
| 2009/0031382 A1 | 1/2009 | Cope |
| 2009/0043674 A1 | 2/2009 | Minsky et al. |
| 2009/0077598 A1* | 3/2009 | Watson et al. ............ 725/93 |
| 2009/0083815 A1 | 3/2009 | McMaster et al. |
| 2009/0119169 A1 | 5/2009 | Chandratillake et al. |
| 2009/0132349 A1 | 5/2009 | Berkley et al. |
| 2009/0157500 A1 | 6/2009 | Ames et al. |
| 2009/0158322 A1 | 6/2009 | Cope et al. |
| 2009/0199230 A1 | 8/2009 | Kumar et al. |
| 2009/0210790 A1 | 8/2009 | Thomas |
| 2009/0248546 A1 | 10/2009 | Norris et al. |
| 2009/0259563 A1 | 10/2009 | Ruhnke et al. |
| 2009/0276805 A1 | 11/2009 | Andrews, II et al. |
| 2009/0320073 A1 | 12/2009 | Reisman |
| 2010/0030578 A1 | 2/2010 | Siddique et al. |
| 2010/0131385 A1 | 5/2010 | Harrang et al. |
| 2010/0145795 A1 | 6/2010 | Haber et al. |
| 2010/0153831 A1 | 6/2010 | Beaton |
| 2010/0223107 A1 | 9/2010 | Kim et al. |
| 2010/0279766 A1 | 11/2010 | Pliska et al. |
| 2010/0287580 A1 | 11/2010 | Harding et al. |
| 2010/0299616 A1 | 11/2010 | Chen et al. |

(56) References Cited

U.S. PATENT DOCUMENTS

| | | |
|---|---|---|
| 2011/0004517 A1 | 1/2011 | Soto et al. |
| 2011/0052144 A1 | 3/2011 | Abbas et al. |
| 2011/0231260 A1 | 9/2011 | Price |
| 2011/0307397 A1 | 12/2011 | Benmbarek |
| 2012/0030704 A1 | 2/2012 | Schiller et al. |

OTHER PUBLICATIONS

"Akamai for Media & Entertainment", Akamai Technologies, Inc., 2007, 38 pages.
"ebd Web Video Player, Increase Online Video Ad Monetization", www.ebdsoft.tv, 2010, 2 pages.
Notification of Transmittal of the International Search Report and the Written Opinion of the International Searching Authority, or the Declaration dated Nov. 14, 2012 in connection with International Patent Application No. PCT/US2012/52897.
"Content distributors can shopping-enable video content", www.web.archive.org, Apr. 27, 2007, 1 page.
Dan Kaplan, "Delivery Agent lets you buy products in your favorite TV shows", www.web.archive.org, May 4, 2007, 4 pages.
"Shopisodes Enable You to Dress Like Your Favorite TV Character", www.web.archive.org, Oct. 26, 2007, 1 page.
Jesse Liebman, "Reality TV That's Social, Bravo!", www.web.archive.org, Dec. 22, 2008, 6 pages.
Kongwah Wan, et al., "Advertising Insertion in Sports Webcasts", 2007 IEEE, p. 78-82.
Miguel Helft, "Google Aims to Make YouTube Profitable With Ads", The New York Times, Aug. 22, 2007, 3 pages.
Chris Tomlinson, "Google tries to relive past glories by making YouTube pay for itself", Birmingham Post, Sep. 4, 2007, 3 pages.
John Skidgel, "Producing Flash CS3 Video, Techniques for Video Pros and Web Designers", 2007, 9 pages.
Jan Krikke, "Streaming Video Transforms the Media Industry", IEEE, Jul./Aug. 2004, p. 6-12.
Tao Mei, et al., "VideoSense—Towards Effective Online Video Advertising", Sep. 23-28, 2007, p. 1075-1084.
Dr. Harry van Vliet, "Where Television and Internet meet . . . New experiences for rich media", Jan. 2002, 35 pages.
"IAB Announces Advertising Creative Guidelines for Online Broadband Video Commercials", Nov. 29, 2005, 4 pages.
"Digital Video In-Stream Ad Format Guidelines and Best Practices", Interactive Advertising Bureau, May 2008, 17 pages.
"Final Broadband Ad Creative Guidelines", Interactive Advertising Bureau, Standards & Guidelines, 4 pages.
"Broadband Ad Creative Guidelines", Dec. 31, 2006, 3 pages.
Rich Media Guidelines: Fall 2004, Dec. 31, 2006, 3 pages.
"About Rich Media Guidelines Compliance: In-Page Units", Jan. 7, 2007, 2 pages.
"About Rich Media Guidelines Compliance: Over-the-Page Units", Jan. 7, 2007, 2 pages.
"Digital Video Ad Serving Template (VAST), Version 2.0", iab., Nov. 2009, 18 pages. (Redlined).
"Digital Video Ad Serving Template (VAST), Version 2.0", iab., Nov. 2009, 16 pages.
"DART Motif for In-Stream Helps Publishers Improve Efficiency, Push the Envelope with Video Ad Effects and Offer Advertisers Trusted, Reliable Reporting Metrics", Nov. 6, 2006, 3 pages.
"DoubleClick Debuts Video Ad-Serving Solution", Nov. 6, 2006, 2 pages.
Liz Gannes, "YouTube's New Inline Ads: Screenshots", May 11, 2007, 7 pages.
Notification of Transmittal of the International Search Report and The Written Opinion of the International Searching Authority, or the Declaration dated Jan. 10, 2014 in connection with International Patent Application No. PCT/US13/47124.

* cited by examiner

INTERACTIVE PRODUCT PLACEMENT SYSTEM AND METHOD THEREFOR

CROSS-REFERENCE TO RELATED APPLICATIONS

This application is a continuation of U.S. patent application Ser. No. 13/762,184, filed Feb. 7, 2013, entitled "INTERACTIVE PRODUCT PLACEMENT SYSTEM AND METHOD THEREFOR," which is a continuation of U.S. patent application Ser. No. 13/605,892, filed Sep. 6, 2012 (now U.S. Pat. No. 8,533,753), entitled INTERACTIVE PRODUCT PLACEMENT SYSTEM AND METHOD THEREFOR, which is a continuation of U.S. patent application Ser. No. 12/363,713, filed Jan. 30, 2009 (now U.S. Pat. No. 8,312,486) which claims the benefit of U.S. Provisional Patent Application No. 61/024,829, filed Jan. 30, 2008. This application hereby claims the benefit and/or priority each of said respective applications (Ser. No. 13/762,184, Ser. No. 13/605,892; and 61/024,829) and hereby incorporates them by reference as if fully set forth herein.

TECHNICAL FIELD

The invention relates generally to interactive video broadcasting, and, more particularly, to placement of products in video broadcast for interactive purchase.

BACKGROUND

It is well-known that video may be broadcast or provided through a number of media, such as television, the Internet, DVD, and the like. To finance such video broadcast, commercial advertisements are often placed in the video. Commercials, however, require that the video be momentarily interrupted while the commercial is displayed. Not only is that annoying to viewers, but modern technology has developed digital video recorders (DVR's) that allow video programs to be pre-recorded, and when viewed, to fast-forward through commercials, thereby defeating the effectiveness and, hence, value of commercials. When commercials are de-valued, costs are not adequately covered, and as a result, broadcast service quality suffers. In many cases, costs are made up by charging viewers for the video service.

Therefore, what is needed is a system and method for advertising commercial products in such a way that they are not annoying and do not interrupt a video production, prompting a user fast-forward through them.

SUMMARY

The present invention, accordingly, provides a method for presenting advertisements for commercial products in video productions, whereby the commercial product is placed in the video production as an element of the video production. A viewer is enabled to interact with the video production to select the product. Information is displayed about the selected product; and the viewer is enabled to purchase the selected product.

More specifically, the invention comprises a web-based rich media software application allowing non-technical end-users the ability to easily create full frame interactive media overlays into the video production which has been encoded with pre-defined cue points that request immersive full motion video interactive overlay elements from an ad-server.

The cue points are utilized to trigger pre-defined advertising events stored and indexed with metadata in an ad server or other database. By way of example, an advertising event may include the extraction of a single video frame or a series of frames of the encoded video production, which in turn becomes the interactive advertisement that is triggered by the pre-set cue point and presented to the user as a seamless advertising/entertainment experience.

Once the cue point triggers an event, the system calls the specific advertisement into the video player and seamlessly overlays the initial video production with the enhanced interactive product ads. The ad is displayed for a predetermined life cycle, such as 5-10 seconds. Once the life cycle of the ad expires, or the ad is clicked or presented to the end user, the advertisement will destroy itself, leaving the viewer with the impression that there was never a break in the viewing experience.

In conjunction with the integrated overlay advertisements, the process of the invention is supplemented with an information and product integrated timeline residing under the video production. At the triggered cue point, watermarked icons/logos appear under the video production. Users can interact with the icons to garner more information about a particular character, location, or advertisers at a specific point in the feature presentation, employing the same aforementioned calls.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, HTTP, XML, PHP, FLV, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein may be performed by a processor such as a microprocessor, a controller, a microcontroller, an application-specific integrated circuit (ASIC), an electronic data processor, a computer, or the like, in accordance with code, such as program code, software, integrated circuits, and/or the like that are coded to perform such functions. Furthermore, it is considered that the design, development, and implementation details of all such code would be apparent to a person having ordinary skill in the art based upon a review of the present description of the invention.

Figure 1:
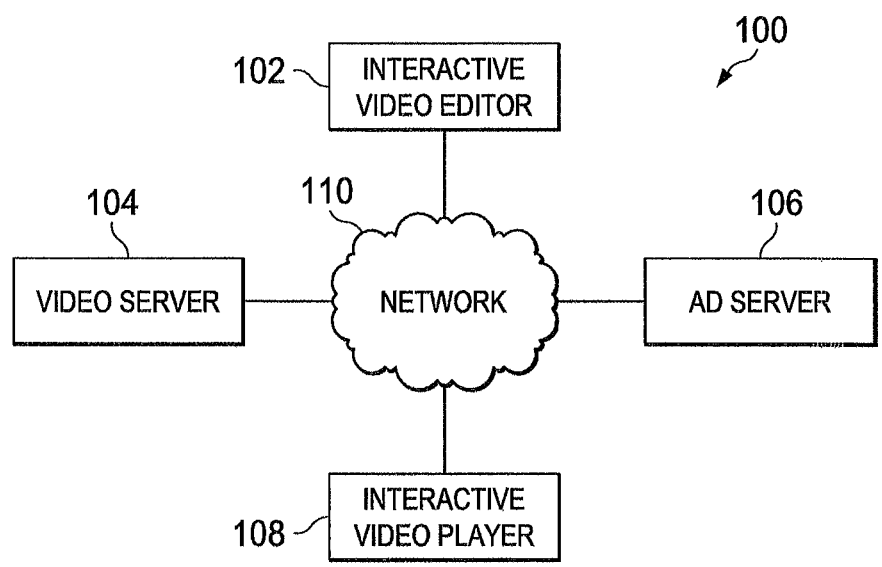
FIG. 1 is a high level block diagram of an interactive product placement system embodying features of the present invention.

Referring to FIG. 1 of the drawings, the reference numeral 100 generally designates an interactive product placement system embodying features of the present invention. The system 100 includes a video server 104 and an ad (i.e., "advertisement") server 106 coupled together via a communication information network effective for video streaming, such as the Internet, 110. An interactive video editor 102 is coupled via the Internet 110 to the video server 104 and ad server 106 for creating immersive interactive advertisements in conjunction with video productions displayed by the video server. An interactive video player 108 is coupled via the Internet 110 to the video server 104 and ad server 106 for displaying video productions from the video server 104 and ads from the ad server 106 in accordance with principles of the present invention.

Figure 3:
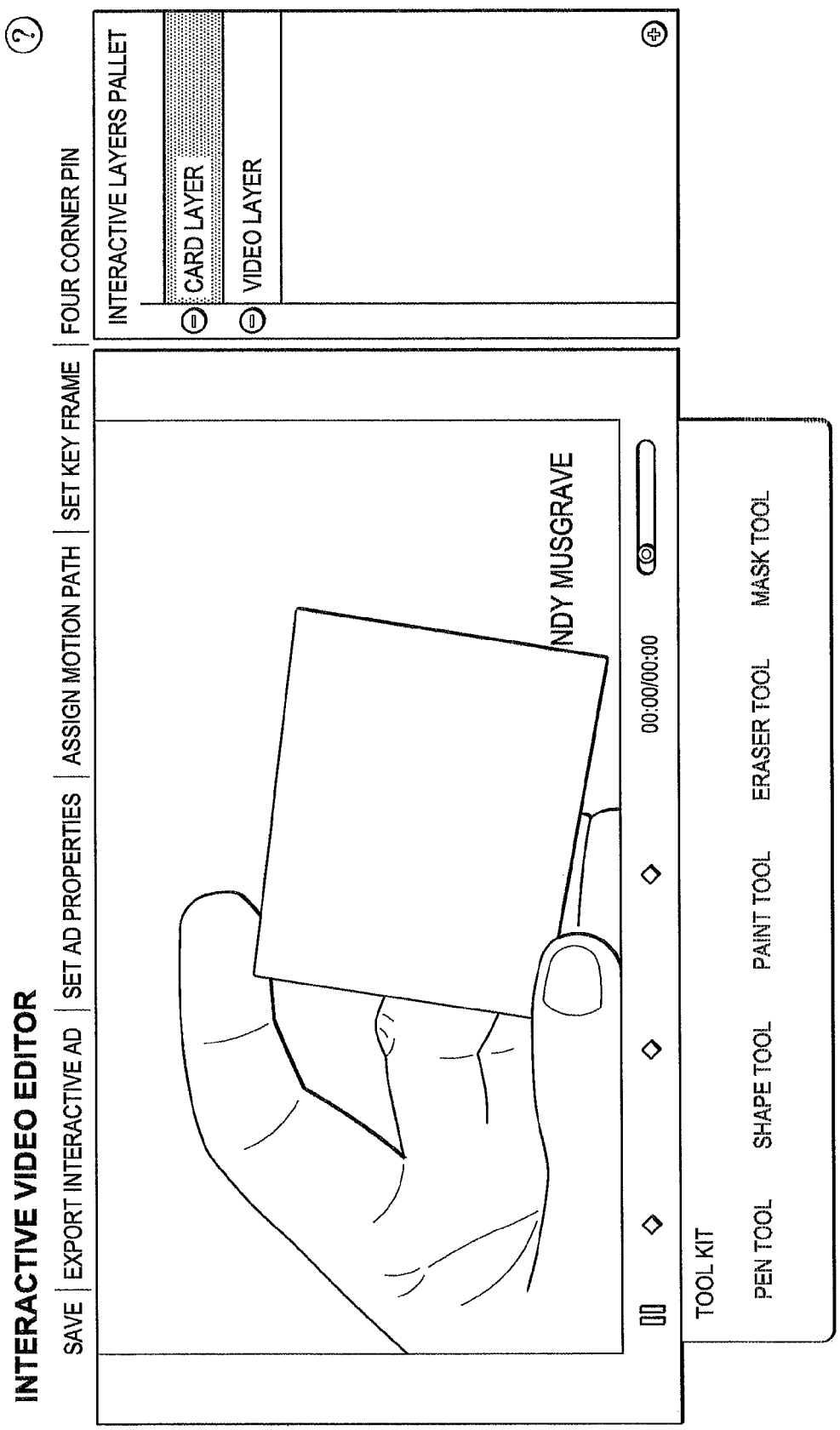
FIG. 3 exemplifies an application of an interactive video editor embodying features of the present invention.

FIG. 3 exemplifies an application of the interactive video editor 102 for enabling non-technical ad representatives to create an immersive interactive advertising experience for users. The editor 102 defines the properties, interactive elements, visuals, and motion of the ad element stored in metadata and XML format and packaged with the ad file. The editor 102 is a rich media application comprising tools, a user interface, and backend connections to the ad server 106. The following lists, by way of example and not limitation, some preferred features of the editor 102:

File: Open

Save: Save an iteration of video project file.

Export: Export in all applicable compiled final production ready formats.

Properties: Set campaign name, lifespan and essential metadata ad formats.

Assign Path: Create guideline to animate overlay object end to end over.

Set Key: Assign animation key frame.

Four Corner Pin: Pin vector points to set start and end frames over underlying video production. Corner Pin effect distorts an image by repositioning each of its four corners. Use it to stretch, shrink, skew, or twist an image or to simulate perspective or movement that pivots from the edge of a layer The interactive video editor 102 also enables layers to be added to the video production. More specifically, an overlay element allows users to see an underlying video preview. The first layer on the bottom forms a base layer, and anything layered on top of that at least partially obscures the layers underneath it.

Still further, the interactive video editor 102 includes a tool kit, comprising the following:

Pen: freeform drawing tool used to define shape

Shape: Set of predefined shapes to use as interactive element

Paint: Brush tool allowing more freeform element creation

Erase: Remove excess erase tool allows you to remove portions of shapes or lines with precision. You can change the size and shape of the eraser as well as the portions of any shape you want to erase by adjusting the options FIG. 4 exemplifies an application of the interactive video player 108 configured with the capabilities to read, display, and interact with code supplied by the corresponding application of the interactive video editor 102. The player 108 is a rich media application comprising tools, a user interface, and backend connections to the ad server 106.

Figure 4:
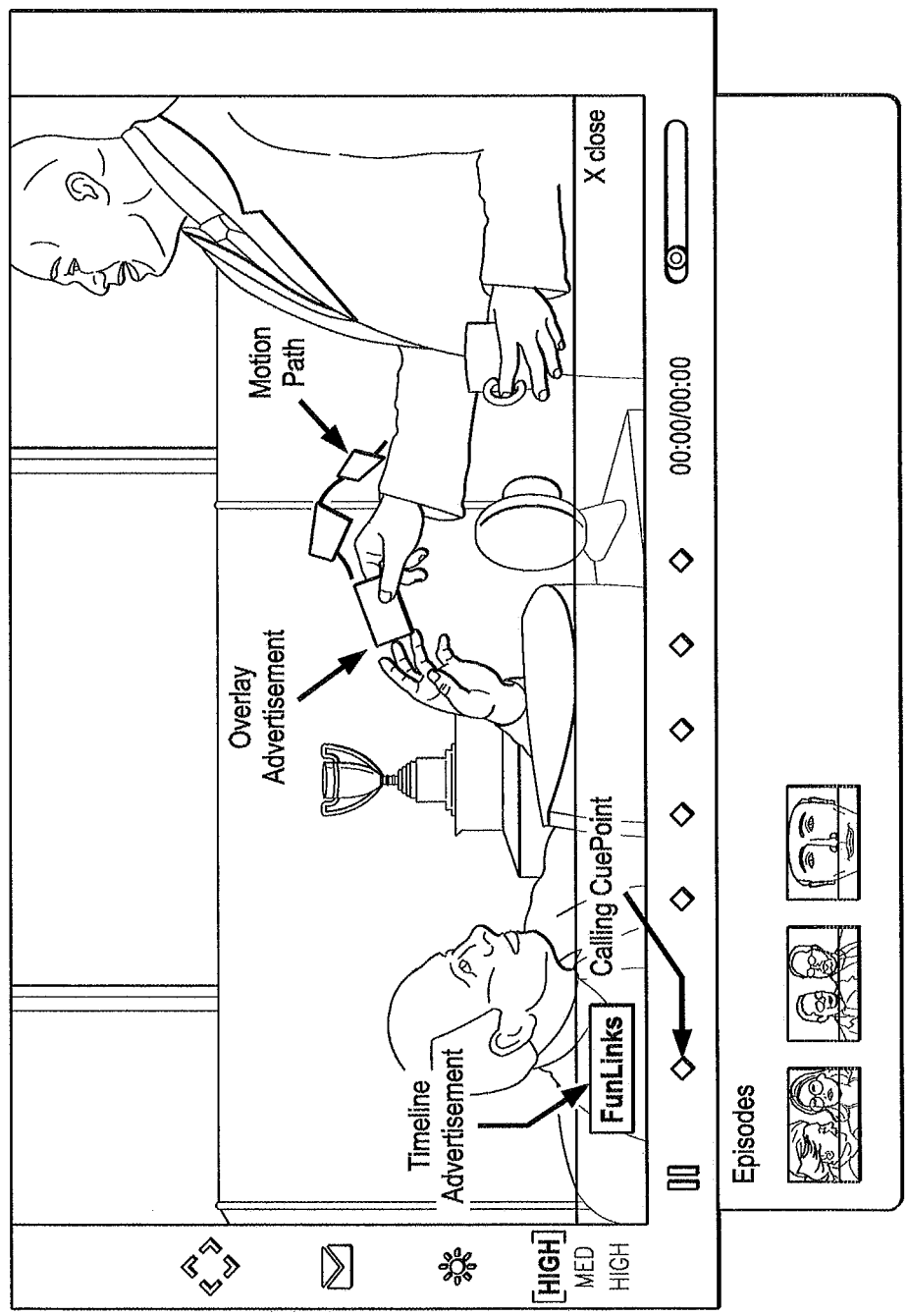
FIG. 4 exemplifies an application of an interactive video player embodying features of the present invention.

As shown in FIG. 4, the video player 108 advertises a card in an overlay as it moves along a motion path. Also shown are an ad icon/logo for the card in a Timeline under the video display, and under the ad icon/logo, a calling cue point corresponding to a respective icon/logo above it. Optionally, under the calling cue points are episodes of the video production being watched. While the timeline is shown positioned beneath the video production, it may be positioned along the top, left, or right margins of the video production.

Figure 2:
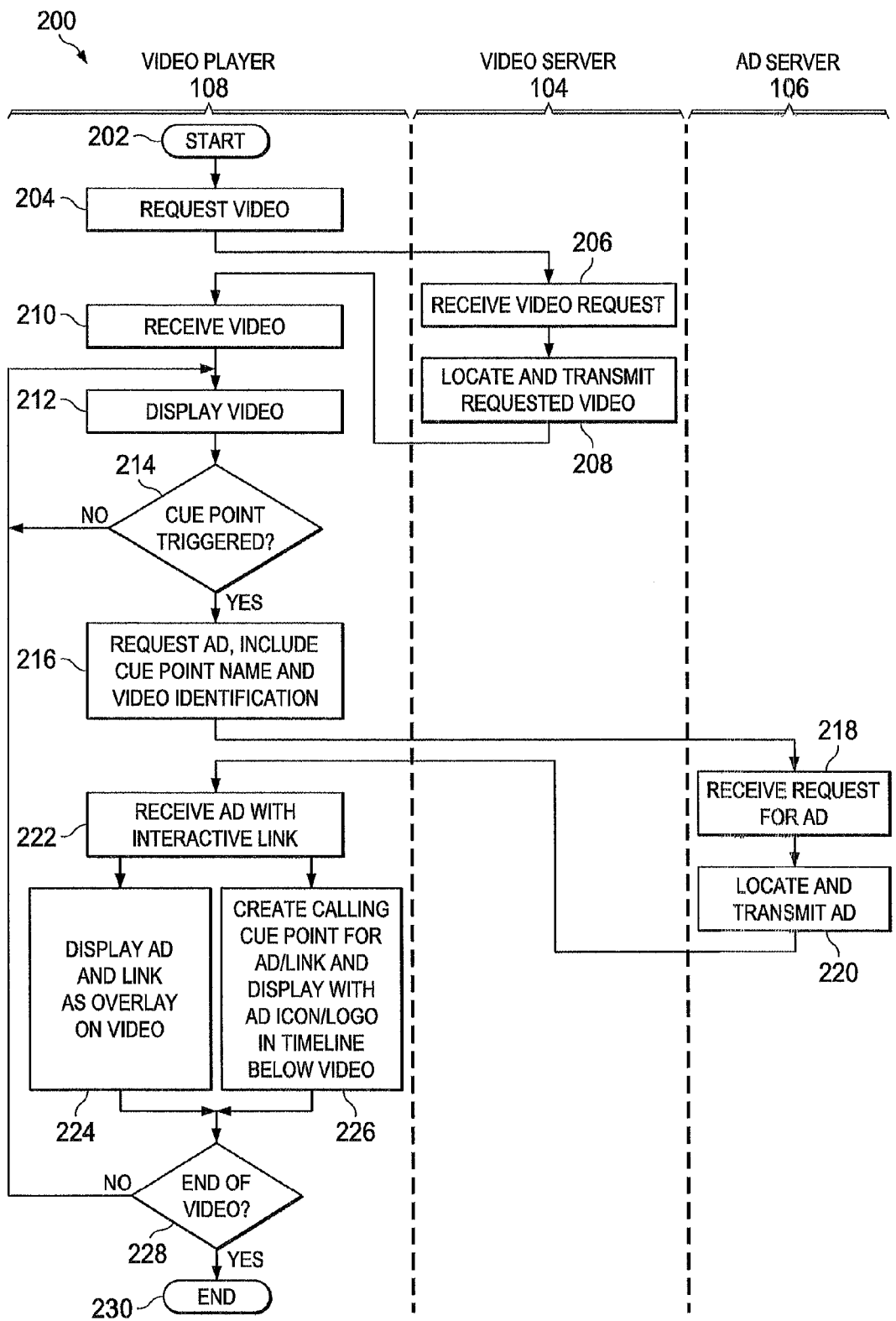
FIG. 2 exemplifies a flow chart illustrating control logic for implementing features of the system of FIG. 1.

FIG. 2 is a flow chart exemplifying steps in the operation of the invention. In step 202 operation begins, and in step 204 a request is generated by the video player 108 (per input from a user) for a video production and transmitted to the video server 104. In step 206, the video server 104 receives the request for a video production and, in step 208, the video server 104 locates the video production and transmits it to the video player 108. In step 212, the video player 108 begins playing the video production until a cue point is triggered in step 214. Upon triggering the cue point, execution proceeds to step 216 wherein the video player generates and transmits to the ad server 106 a request via HTTP POST requests for an ad, and includes with the request a cue point name and video ID into which the ad will be placed. The following exemplifies a request generated at step 216:

FLVPlayback.addEventListener(Video.CuePoint, function( ){Var request=new

URLRequest ("filename.php?func=advertisment&movie_id="+ movie_id+"&cue_point="+this.cuePointName);

}

In step 218, the ad server 106 receives the ad request and, in step 220, the ad server 106 locates the requested ad and transmits the ad to the video player 108. The ad requests are made form the player application via HTTP POST requests. The response from the ad server or other database will be a small XML that gives the path of the ad, length, and any other information that's related to the ad. The player reacts to events signaled by the cue points request and will execute actions defined inside the event trigger instructing the player with the ad parameters, e.g., kind of ad file requested, the action to take, e.g., pause, lifespan, effect, specifics coordinates of the over-laid ad, and the like, as well as any other custom defined configurations.

The following exemplifies simple cue point metadata, which is generated by the video editor 102 and stored with the advertisement:

| TIME | CUE POINT NAME | ACTION | DURATION | URL PATH |
| --- | --- | --- | --- | --- |
| 1:54.02 | soda_can | Fade In | 10 sec. | http://yoururl.com/ad |
| 2:02.06 | pizza_box | Motion Path | 10 sec. | http://yoururl.com/ad |
| 9:02.04 | sneakers | Glow | 5 sec. | http://yoururl.com/ad |

In step 222, the video player receives the ad with an interactive link which a user/viewer may select and click on to obtain further information about the product being advertised, and optionally purchase same. The ad is then displayed as either or both an ad with the link as an overlay on the video production in step 224, or in step 226 as a calling cue point for the ad and link in an icon or logo in a timeline below the video production. In step 224, the ad is displayed for the duration indicated in the cue point data, as exemplified above. The icon or logo in the timeline of step 226 may remain in the timeline as long as space permits, that is, until space is needed for a icon or logo of a subsequent icon or logo.

In step 228, a determination is made whether the video production is complete. If the video production is not complete, execution returns to step 212; otherwise, execution is terminated as step 230.

Figure 5:
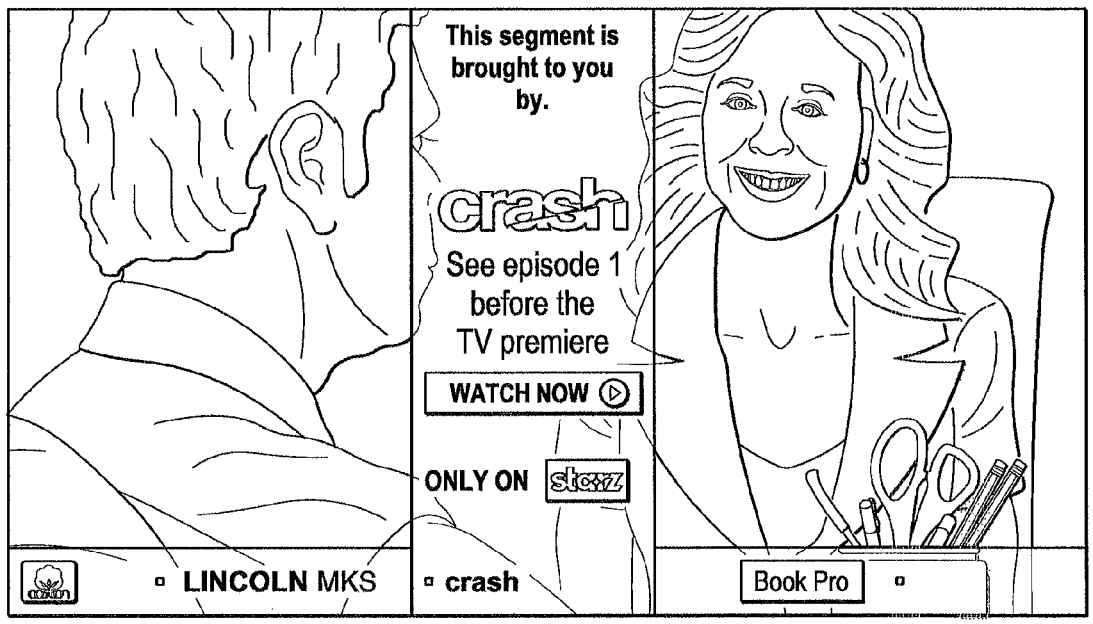
FIG. 5 exemplifies a product placement timeline embodying features of the present invention.
Figure 6:
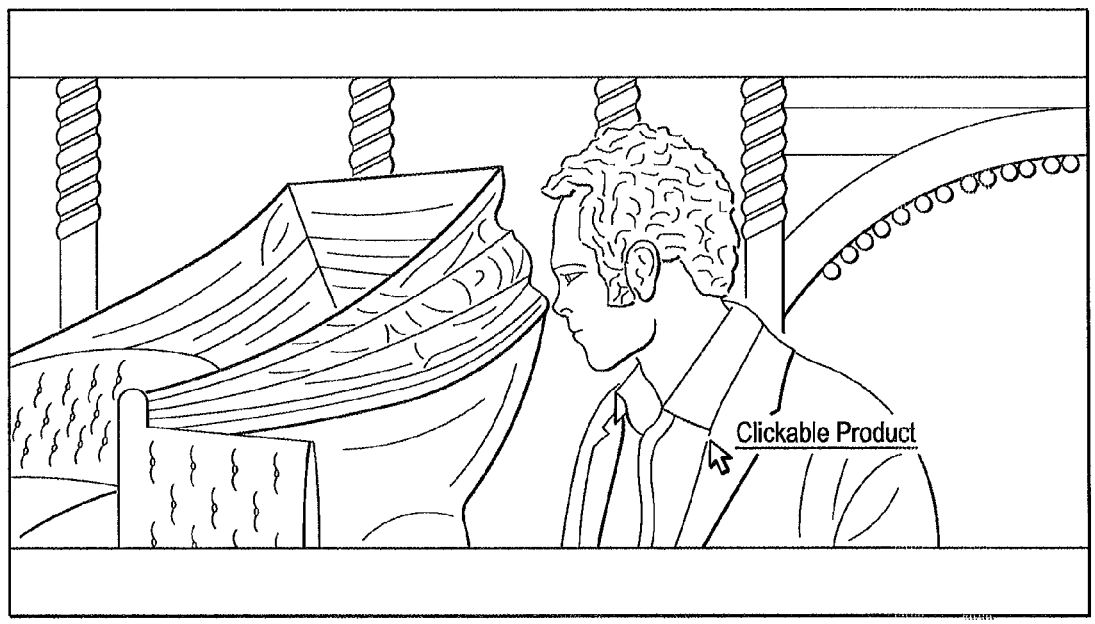
FIG. 6 exemplifies an interactive product placement embodying features of the present invention.

FIGS. 5 and 6 provide additional visual examples of interactive overlay and timeline ads, in which the video player 108 seeks cue points set in the video content triggering an ad event requesting either a timeline advertisement or an embedded live overlay advertisement. More specifically, FIG. 5 exemplifies how timeline information and advertisement offers directly correspond to cue points inside specific video content assets. FIG. 6 exemplifies how cue points trigger pre-defined advertising events stored and indexed with metadata in the ad server or other database. An example of the event may include the extraction of a single video frame or a series of frames of a video production, which in turn becomes the interactive advertisement that is laid over the video production to create a seamless interactive clickable video ad. As shown in FIG. 6, the product being advertised is highlight via rotoscoping, and additional information may be obtained about by clicking on the product.

By the use of the present invention, an improved method is provided for advertising products by interactively placing them either in a timeline or embedding them in a live overlay on a video production.

It is understood that the present invention may take many fauns and embodiments. Accordingly, several variations may be made in the foregoing without departing from the spirit or the scope of the invention. For example, the compositing of elements otherwise non-existing into the finished advertising product or filming green screen products and services into the production to later composite via the video editing application. Means for interconnecting components of the system may be achieved other than via the Internet, such as via fiber optic or cable network or satellite. The video stream may be supplied by alternative means incorporating, for example, DVD technology.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A non-transitory computer readable medium having display logic stored thereon, the display logic configured when executed by at least one processing device to:
generate a user interface for a video production having a video portion that is not broken into segments by an interruptive advertisement and that displays content about one or more products or services;
wherein the user interface is configured to:
display a timeline in association with the video portion;
display one or more visual calling cue points in the timeline; and
simultaneous with the display of the one or more visual calling cue points, display a representation of an advertisement associated with at least one of the one or more visual calling cue points, the user interface configured to display the representation of the advertisement in a location that is based on a displayed location of the at least one associated visual calling cue point in the timeline, the representation of the advertisement related to at least one of the one or more products or services;
wherein the representation of the advertisement is configured to allow a user to retrieve further information not previously displayed about the at least one of the one or more products or services.

2. The non-transitory computer readable medium of claim 1, wherein the user interface is configured to display the representation of the advertisement as an overlay over the video production.

3. The non-transitory computer readable medium of claim 1, wherein the user interface is configured to display at least some of the further information as an overlay over the video production.

4. The non-transitory computer readable medium of claim 1, wherein the user interface is configured to cover the display of the video production and allow a display of the video production by being transparent in portions.

5. The non-transitory computer readable medium of claim 1, wherein the representation of the advertisement does not overlay the video production.

6. The non-transitory computer readable medium of claim 1, wherein the further information or the representation of the advertisement is configured to allow a user to conduct a transaction that involves a user submitting information that is sent to a remote server.

7. The non-transitory computer readable medium of claim 1, wherein the user interface is further configured to request the representation of the advertisement from a remote server according to instructions received from a remote server.

8. The non-transitory computer readable medium of claim 1, wherein the representation of the advertisement is selectively displayable.

9. The non-transitory computer readable medium of claim 1, wherein each visual calling cue point represents a point during the video production that an interactive item related to the at least one of the one or more products or services is displayed.

10. A method of advertising, the method comprising:
transmitting or receiving code configured to generate a user interface for a video production having a video portion that is not broken into segments by an interruptive advertisement, and that displays content about one or more products or services;
wherein the user interface is configured to:
display a timeline in association with the video portion;
display one or more visual calling cue points in the timeline; and
simultaneous with the display of the one or more visual calling cue points, display a representation of an advertisement associated with at least one of the one or more visual calling cue points, the user interface configured to display the representation of the advertisement in a location that is based on a displayed location of the at least one associated visual calling cue point in the timeline, the representation of the advertisement related to at least one of the one or more products or services;
wherein the representation of the advertisement is configured to allow a user to retrieve further information not previously displayed about the at least one of the one or more products or services.

11. The method of claim 10, wherein the user interface is configured to display the representation of the advertisement as an overlay over the video production.

12. The method of claim 10, wherein the user interface is configured to display at least some of the further information as an overlay over the video production.

13. The method of claim 10, wherein the user interface provides a layer that allows the display of the video production by being transparent in portions.

14. The method of claim 10, wherein the representation of the advertisement does not overlay the video production.

15. The method of claim 10, wherein the further information or the representation of the advertisement is configured to allow a user to conduct a transaction that involves a user submitting information that is sent to a remote server.

16. The method of claim 10, further comprising:
requesting the representation of the advertisement from a remote server according to instructions received from a remote server.

17. The method of claim 10, wherein the representation of the advertisement is selectively displayable.

18. The method of claim 10, wherein each visual calling cue point represents a point during the video production that an interactive item related to the at least one of the one or more products or services is displayed.

19. A system for advertising, the system comprising:
one or more computers configured to transmit or receive code configured to generate a user interface for a video production having a video portion that is not broken into segments by an interruptive advertisement and that displays content about one or more products or services;
wherein the user interface is configured to:
display a timeline in association with the video portion;
display one or more visual calling cue points in the timeline; and
simultaneous with the display of the one or more visual calling cue points, display a representation of an advertisement associated with at least one of the one or more visual calling cue points, the user interface configured to display the representation of the advertisement in a location that is based on a displayed location of the at least one associated visual calling cue point in the timeline, the representation of the advertisement related to at least one of the one or more products or services;
wherein the representation of the advertisement is configured to allow a user to retrieve further information not previously displayed about the at least one of the one or more products or services.

20. The system of claim 19, wherein the user interface is configured to display the representation of the advertisement as an overlay over the video production.

21. The system of claim 19, wherein the user interface is configured to display at least some of the further information as an overlay over the video production.

22. The system of claim 19, wherein the user interface is further configured to cover the display of the video production and allow the display of the video production by being transparent in portions.

23. The system of claim 19, wherein the representation of the advertisement does not overlay the video production.

24. The system of claim 19, wherein the further information or the representation of the advertisement is configured to allow a user to conduct a transaction that involves a user submitting information that is sent to a remote server.

25. The system of claim 19, wherein the user interface is configured to request the representation of the advertisement from a remote server according to instructions received from a remote server or another remote server.

26. The system of claim 19, wherein the representation of the advertisement is selectively displayable.

27. The system of claim 19, wherein each visual calling cue point represents a point during the video production that an interactive item related to the at least one of the one or more products or services is displayed.

28. The system of claim 19, wherein the representation of the advertisement comprises at least one of: an icon or a logo.

29. The system of claim 19, wherein the user interface is configured to display the representation of the advertisement above the at least one associated visual calling cue point.

30. The system of claim 19, wherein the user interface is configured to display the representation of the advertisement within the timeline.

* * * * *

UNITED STATES PATENT AND TRADEMARK OFFICE
CERTIFICATE OF CORRECTION

PATENT NO. : 8,782,690 B2  
APPLICATION NO. : 14/042477  
DATED : July 15, 2014  
INVENTOR(S) : Christian Briggs et al.

Page 1 of 1

It is certified that error appears in the above-identified patent and that said Letters Patent is hereby corrected as shown below:

On the Title Page:

Item (63)

"Continuation of application No. 13/762,184, filed on Feb. 7, 2013, now Pat. No. 8,549,555, and a continuation of application No. 13/605,892, filed on Sep. 6, 2012, now Pat. No. 8,533,753, and a continuation of application No. 12/363,713, filed on Jan. 30, 2009, now Pat. No. 8,312,486."

should read

-- Continuation of application No. 13/762,184, filed on Feb. 7, 2013, now Pat. No. 8,549,555, which is a continuation of application No. 13/605,892, filed on Sep. 6, 2012, now Pat. No. 8,533,753, which is a continuation of application No. 12/363,713, filed on Jan. 30, 2009, now Pat. No. 8,312,486. --

Signed and Sealed this  
Nineteenth Day of April, 2016

Michelle K. Lee  
*Director of the United States Patent and Trademark Office*